(12) United States Patent
Cazzanti et al.

(10) Patent No.: US 8,490,479 B2
(45) Date of Patent: Jul. 23, 2013

(54) TYRE INFLATION VALVE CONNECTABLE TO A TRANSDUCER

(75) Inventors: Stefano Cazzanti, Cremona (IT); Riccardo Dusi, Sospiro (IT); Gabriele Foglia, Malagnino (IT); Matteo Gosi, Cremona (IT)

(73) Assignee: Wonder Spa, Cremona (IT)

( * ) Notice: Subject to any disclaimer, the term of this patent is extended or adjusted under 35 U.S.C. 154(b) by 111 days.

(21) Appl. No.: 13/132,446

(22) PCT Filed: Dec. 10, 2009

(86) PCT No.: PCT/IB2009/007778
§ 371 (c)(1),
(2), (4) Date: Jul. 19, 2011

(87) PCT Pub. No.: WO2010/067197
PCT Pub. Date: Jun. 17, 2010

(65) Prior Publication Data
US 2012/0103483 A1 May 3, 2012

(30) Foreign Application Priority Data

Dec. 12, 2008 (IT) .............................. CR2008A0027

(51) Int. Cl.
*B60C 23/02* (2006.01)
(52) U.S. Cl.
USPC ........................................ 73/146.2; 73/146.8
(58) Field of Classification Search
USPC ................................................ 73/146–146.8
See application file for complete search history.

(56) References Cited

U.S. PATENT DOCUMENTS

| | | | | |
|---|---|---|---|---|
| 5,977,870 A * | 11/1999 | Rensel et al. | ................ | 340/447 |
| 7,178,390 B1 * | 2/2007 | Kalovsky et al. | ................ | 73/146 |
| 7,568,386 B2 * | 8/2009 | Blossfeld | ................ | 73/146.8 |
| 2003/0154779 A1 * | 8/2003 | Polenghi | ................ | 73/146.8 |
| 2005/0011257 A1 * | 1/2005 | Modawell et al. | ................ | 73/146 |
| 2006/0272402 A1 * | 12/2006 | Yin et al. | ................ | 73/146.8 |
| 2007/0062268 A1 * | 3/2007 | Blossfeld et al. | ................ | 73/146.8 |
| 2007/0186637 A1 * | 8/2007 | Blossfeld | ................ | 73/146.8 |
| 2007/0295076 A1 * | 12/2007 | Blossfeld et al. | ................ | 73/146.8 |
| 2010/0024539 A1 * | 2/2010 | Hamm et al. | ................ | 73/146.5 |
| 2012/0017672 A1 * | 1/2012 | Uh et al. | ................ | 73/146.8 |

FOREIGN PATENT DOCUMENTS

| | | |
|---|---|---|
| DE | 10 2005 027002 | 12/2006 |
| EP | 1 433 625 | 6/2004 |
| FR | 2 843 562 | 2/2004 |

OTHER PUBLICATIONS

International Search Report dated Feb. 12, 2010, in corresponding PCT application.

* cited by examiner

*Primary Examiner* — Andre Allen
(74) *Attorney, Agent, or Firm* — Young & Thompson

(57) ABSTRACT

A valve for inflating tires of tired wheels associable with a transducer provided with electronic sensors for detection and transmission of certain operating parameters of the tire. The valve is arranged for being mounted on a rim of a wheel for vehicles so that the valve projects outside the rim and the transducer is positioned within a chamber delimited by the tire and by the rim. The valve includes signaling units which, once the valve has been mounted, are visible from the outside of the wheel. The signaling units are correlated univocally with the orientation of the transducer, and are arranged for indicating the position assumed by the transducer inside said chamber.

10 Claims, 2 Drawing Sheets

TYRE INFLATION VALVE CONNECTABLE TO A TRANSDUCER

BACKGROUND OF THE INVENTION

1. Field of the Invention

The present invention relates to valves for inflating tyres of tyred wheels, in particular tyres for vehicles, where the term "vehicles" means motor vehicles, vans, motorcycles, or in general means of locomotion on tyres.

In greater detail, the invention regards a valve designed for being used in the context of TPMS (Tyre Pressure Monitoring System) technology, in which electronic sensors for detection and transmission of certain operating parameters of the tyres, in particular pressure, but also, for example, temperature, are mounted directly on the valve itself, and the valve is fixed to the wheel by means of a hole made in the rim.

The valves used in the context of TPMS devices are normal valves of the clamp-in or snap-in type, i.e., of the type that can be associated to the rim of the wheel by means of screw-type or elastic snap clamping means.

The structure of the valve is associated to a transducer, supplied by a battery, which detects, by means of electronic sensors, the value assumed by parameters that are significant for proper operation of the wheel and enables radio transmission of the data collected to a reading control unit positioned, for example, on the instrument panel of the vehicle.

2. Description of the Related Art

According to the known art, illustrated for example in FIGS. 1 and 2, the valve-transducer assembly is mounted on the rim of the wheel in such a way that the valve projects outside the rim and the transducer is housed within the chamber delimited between the tyre and the rim itself so as to be tangential to the rim itself.

Currently, rubber-coated valves of the snap-in type are preferably used for light vehicles, and metal valves of the clamp-in type are preferably used for high-performance vehicles. Both have a shape with perfectly radial symmetry as regards the portion outside the rim, and the connection between the valve and the transducer, in order to constitute a valve-transducer assembly, can be of the type with screwed coupling, slot-in shape fitting, or co-moulding.

Said valve-transducer assemblies have some limits and disadvantages due above all to the impossibility of knowing the position assumed by the transducer inside the air chamber of the tyre when the assemblies are mounted on the wheel.

When, for example, inflation of the tyre mounted on the rim is automated, i.e., it is carried out on an industrial production line, in case the transducer is not positioned correctly in its seat, and is for example partially rotated, there is the risk, during pumping of the tyre, that the latter, by expanding, comes to strike against the transducer, thus breaking it.

In other cases, the centrifugal force of the wheel in motion leads the transducer, above all in the case of valves of a rubber-coated type, to rise with respect to the internal surface of the rim, moving it away from its plane of rest allowing it to turn and thus set itself out of its seat. When the tyre is being removed, since there is no reference of the position assumed by the transducer inside the air chamber, even the expert hands of a person skilled in the sector can cause impact of the edge of the tyre against the transducer, thus damaging it irreparably.

Valves with metal fixing of the clamp-in type are more rigid and less subject to rotations caused by the thrusts of the centrifugal force, but are in any case readily subject to possible damage: during final tightening of the nut with which the valve-transducer assembly is fixed to the rim, an improper dosing of the force risks causing rotation of the entire valve-transducer assembly, thus dislodging the transducer out of its seat, which can thus incur in the risks described above during tyre change.

BRIEF SUMMARY OF THE INVENTION

Aim of the invention is to overcome the above limits, which jeopardize efficiency and duration of the transducers of TPMS systems.

Aim of the invention is to provide a valve for a tyre that can be used with TPMS technology in which a mark is made available, which is visible from outside the rim when the valve-transducer assembly is mounted on the wheel, said mark indicating univocally the position assumed by the transducer inside the air chamber delimited by the tyre.

In addition, aim of the invention is to enable automatic selection and elimination directly from the assembly line of the wheels in which the valve-transducer assemblies are applied to the rims in a non-compliant way, when the industrial production line is automated and equipped with known detection systems, for example of an optical type.

A further aim of the invention is to enable exploitation of the external geometry of the valves as gripping and engagement system to enable orientation from outside of the transducers located inside that have assumed an incorrect position, and, more in general, to facilitate installation of the valve.

Finally, aim of the invention is also to enable monitoring over time of the position assumed by the transducer within the tyre.

The aims are achieved with a valve for inflating tyres of tyred wheels associable with a transducer provided with electronic sensors for detection and transmission of certain operating parameters of the tyre, wherein the valve is arranged for being mounted on a rim of a wheel for vehicles so that the valve projects outside the rim and the transducer is positioned within a chamber delimited by the tyre and by the rim, characterized in that said valve comprises signalling means that, once the valve has been mounted, are visible from the outside of the wheel, where said signalling means are correlated univocally with the orientation of the transducer, and are arranged for indicating the position assumed by the transducer inside said chamber.

According to one aspect of the invention, the signalling means can be notches made on the rubber-coated or metal portion of the valve, references made in rilief, coloured signs, marks, wordings or else also variations of geometrical shape at least of the portion of valve external to the rim.

According to the latter aspect of the invention said signalling means of the "shape-variation" type can be arranged for co-operating mechanically with suitable tools for acting on the orientation of the valve-transducer assembly mounted on the rim.

According to a further aspect of the invention, if said indicating means of the "shape-variation" type have a corresponding means also in the portion of valve arranged for being fitted to the transducer, they can represent a unique mode of connection between the two components.

In general, the indicating means can be applied to the valve when the valve-transducer assembly is already assembled, regardless of the system adopted for fixing the transducer to the valve, or else the above indicating means can be previously applied to the valve, and in this case the system for fixing the valve to the transducer must be such as to force the transducer to assume a pre-set orientation with respect to said indicating means.

The advantages of the invention are evident: it is possible to monitor in an indirect way, i.e., from the outside, via a unique mating between the front of the valve and the transducer, the position assumed by the transducer inside the wheel during all the steps of installation, use, and removal of the tyre, so as to guarantee at all times proper operation of the transducer and preserve it from possible damage due to any contact with the tyre caused by displacements and rotations of the transducer itself.

The indicating means enable interaction with the systems for automatic inflation of the tyre, and consequently speed up production, because they can be recognized and read also on the assembly line, enabling automatic rejection of the non-compliant pieces, in which the transducer is recognized as being rotated or displaced with respect to its ideal seat.

In particular, if the indicating means are constituted by an asymmetrical shape of the valve, they can advantageously represent systems for gripping and engagement of tools useful for rotation and orientation of the valve-transducer assembly in the case where it is to be brought back into its correct position.

Furthermore, this control and monitoring over time of the entire assembly insures proper operation of the TPMS system, long service life of the sensors, and a considerable economic saving on spares and maintenance.

Finally, the invention increases safety since proper installation of the valve-transducer assembly reduces the risk of detachment of the sensor during motion of the vehicle.

BRIEF DESCRIPTION OF THE DRAWINGS

The above and further advantages will emerge more clearly in what follows, where a preferred embodiment of the invention is described, purely by way of non-limiting example, and with the aid of the annexed figures, wherein.

DETAILED DESCRIPTION OF THE PREFERRED EMBODIMENTS

Figure 1:
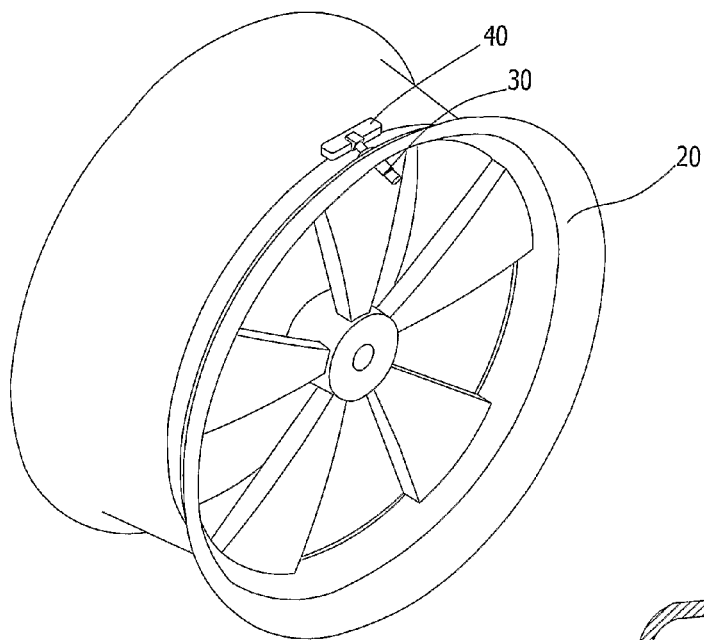
FIG. 1 is a perspective view of a valve-transducer assembly for TPMS systems mounted on a rim of a wheel according to the known art.

With reference to FIG. 1, a rim 20 of a wheel of motor vehicle is shown, mounted on which, according to the known art, is a valve 30 and a transducer 40 assembled together to form a valve-transducer assembly for TPMS systems.

Figure 2:
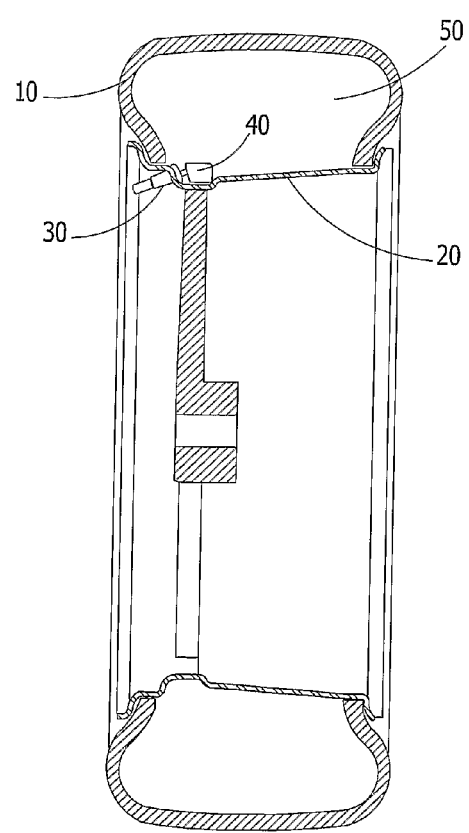
FIG. 2 is a cross section of a valve-transducer assembly for TPMS systems mounted on a wheel according to the known art.

FIG. 2 shows a cross section of the same rim 20 of FIG. 1, mounted on which, once again according to the known art, is a tyre 10 delimiting a chamber 50, positioned within which is the transducer 40 associated to a valve 30 for TPMS systems.

From the figures it is evident that part of the valve 30 sets itself always projecting out of the rim 20 and is hence visible once the tyre 10 is installed and inflated.

Figure 3:
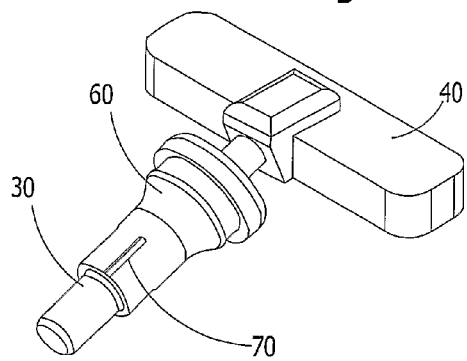
FIG. 3 is a perspective view of a valve with a system for identification and control of the position of the transducer according to a first embodiment of the invention.

With reference to FIG. 3 a valve-transducer assembly according to a first aspect of the invention is illustrated.

The valve 30, of a cylindrical shape, is of the "snap-in" type, i.e., partially coated by a ring of rubber material 60 that functions as seal gasket when the valve-transducer assembly is mounted on the wheel through a hole made in the rim 20.

The rubber-coated portion 60 is provided with an indicating means 70, constituted for example by a notch or incision, arranged for modifying the geometry of the valve 30, which is otherwise perfectly symmetrical, at least in the portion that is to project outside the rim 20. Said sign 70 is positioned so as to be uniquely correlated to the orientation assumed by the transducer 40.

According to other equivalent variants of the invention, as an alternative to the incision it is possible to provide on the valve 30 coloured signs, grooves, small projections, marks, wordings, or any indication that is able to render the portion of valve visible from outside the wheel asymmetrical so that it is possible to correlate it to the position assumed by the transducer 40.

Said indicating means 70 can likewise be positioned also on the metal part of the valve, and in this case they can be used also for valves of the "clamp-in" type, thus once again achieving the aforesaid purpose.

Figure 4:
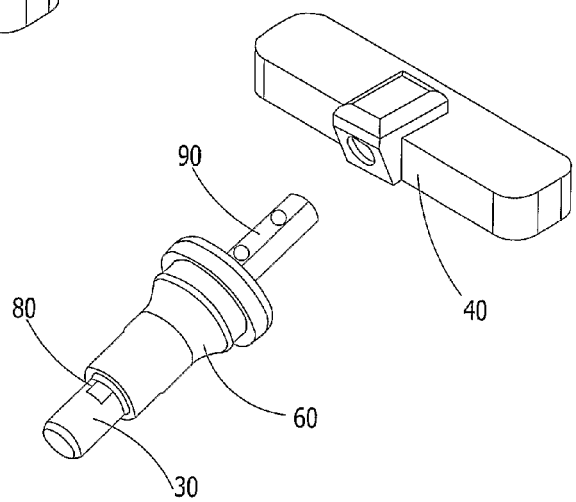
FIG. 4 is a partially exploded perspective view of a valve with a system for identification and control of the position of the transducer according to a variant of the invention.

FIG. 4 illustrates, instead, a possible variant of the invention in which the coupling between a valve 30 and a transducer 40 is once again present, but the indicating means 70 comprise a variation of shape of the cylindrical symmetry of the valve.

Said variation consists of a flat 80 of a portion of valve 30, according to a plane parallel to the axis of the cylindrical tube constituting the valve itself.

Figure 5:
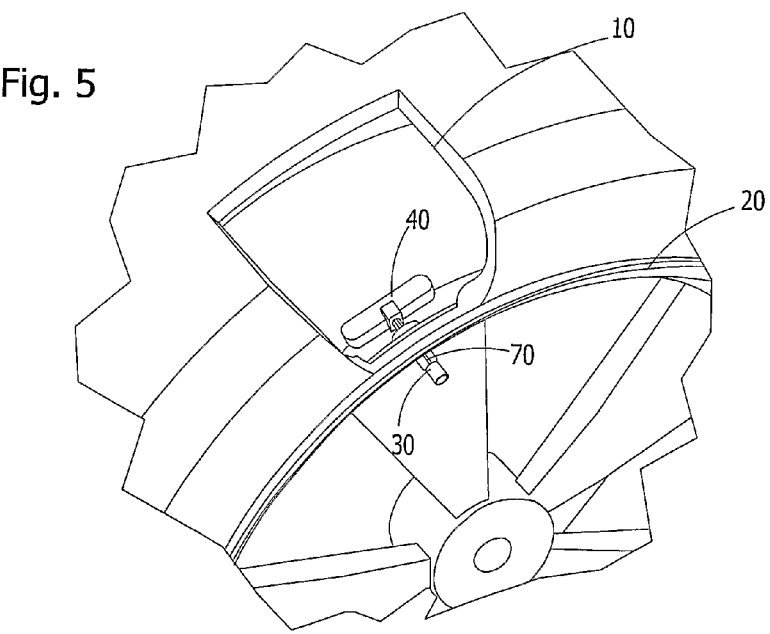
FIG. 5 illustrates a detail, in partially sectioned perspective view, of a wheel installed on which is the valve-transducer assembly of FIG. 4.

FIG. 5 represents complete installation of a valve-transducer assembly, according to the variant illustrated in FIG. 4, on a rim 20 associated to which is also the tyre 10.

The aforesaid variation of shape, provided by the flat 80, can function further as engagement or grip for mechanical tools arranged for enabling rotation of the assembly to obtain possible straightening or proper orientation of the transducer 40, connected to the valve 30, inside the air chamber 50 delimited between the rim 20 and the tyre 10.

The same variation of shape can have a similar correspondence also in the portion of valve internal to the rim, constituted, for example, by a flat 90, so as to provide a constraint for coupling of the transducer 40, that, in this way, will be uniquely correlated to the mark 80 visible from outside the rim.

The inventive idea can be applied to valve 30-transducer 40 assemblies according to two different methods, which make it possible to provide, outside the rim 20, a visual indication of the position assumed by the transducer 40 inside the rim.

According to a first embodiment a visible sign or mark of any nature 70, 80 is first made on the valve 30, in the portion thereof that is to project outward; then, said valve 30 is fitted to a transducer 40, in a unique way, for example with a shape fit or a pre-defined slotted fit, in such a way that to the sign 70, 80 on the valve 30 there will correspond a chosen orientation of the transducer 40. Then the valve-transducer assembly 30-40 is positioned on the rim 20 by being arranged in such a way that the transducer 40 rests on the top surface of the rim 20 and the portion of valve 30 provided with the visual indicating means is external to the entire wheel block with the visual indicating means 70, 80 in the pre-defined correct position. When operations are through, the tyre 10 is positioned and inflated.

A second embodiment envisages mounting in a generic way the valve 30 together with the transducer 40, for example with an internal screw-lead screw connection, and only subsequently applying the indicating means on the valve portion that projects from the rim 20 by correlating said indicating means to the orientation assumed by the transducer 40 already associated to the valve 30.

A third embodiment envisages assembly of the transducer 40 after the valve 30 has been installed on the rim 20 in such a way that the indicating means 70, 80 are in the correct position pre-defined by the assembly instructions.

In case the indicating means chosen is of the shape-variation type, the flat 80 is previously made on the valve 30, and the subsequent steps of installation are performed according to the first embodiment or third embodiment described above, with the advantage that, if the flat is correlated with a corresponding shape variation also in the portion of valve that is to be fitted to the transducer 40, the latter can be automatically fitted in a unique way to the valve itself and consequently automatically correlated to the sign, which will remain visible from outside the wheel.

The invention, as described and illustrated, enables the pre-set aims and purposes to be achieved.

In practice, it is clear that all the details of geometry, shape, and dimensions may be replaced with functionally equivalent ones, as likewise the materials may vary according to the requirements and to the automotive field of application, without thereby departing from the sphere of protection of the claims.

The invention claimed is:

1. A valve (30) for inflating tires (10) associable with a transducer (40) provided with electronic sensors for detection and transmission of certain operating parameters of the tire (10), wherein the valve is arranged for being mounted on a rim (20) of a wheel for vehicles so that the valve (30) projects outside the rim (20) and the transducer (40) is positioned within a chamber (50) delimited by the tire (10) and by the rim (20), said valve (30) comprising:
   means for signaling (70, 80) that, once the valve has been mounted, are visible from the outside of the wheel,
   wherein said means for signaling are correlated univocally with the orientation of the transducer (40), and are arranged for indicating the position assumed by the transducer inside said chamber (50).

2. The valve (30) according to claim 1, wherein said means for signaling (70, 80) are chosen among markings, writings, incisions, relieves, colored signs, or variations of geometrical shape.

3. The valve (30) according to claim 2, wherein said means for signaling with variations of geometrical shape comprise a flat section (80) on a portion of the valve (30) that is outside the wheel rim (20).

4. The valve (30) according to claim 2, wherein said means for signaling (80) with variations of geometrical shape are associated with unique means for joining having variations of geometrical shape between said valve (30) and said transducer (40) on a portion of the valve (30) inside the wheel rim (20).

5. The valve (30) according to claim 4, wherein said unique means for joining with variations of geometrical shape comprise a flat face (90).

6. The valve (30) according to claim 2, wherein said means for signaling with variations of geometrical shape cooperate mechanically with equipment arranged for orienting an assembly of the valve (30) and the transducer (40).

7. A valve transducer assembly comprising the valve (30) according to claim 1 and the transducer (40).

8. A tired wheel for motor vehicles comprising a valve-transducer assembly according to claim 7.

9. A tired vehicle comprising the tired wheel according to claim 8.

10. The valve (30) according to claim 1, wherein the indicating the position assumed by the transducer inside said chamber (50) includes indicating a rotational position of the transducer with respect to the valve.

* * * * *

UNITED STATES PATENT AND TRADEMARK OFFICE
CERTIFICATE OF CORRECTION

PATENT NO.        : 8,490,479 B2  
APPLICATION NO.   : 13/132446  
DATED             : July 23, 2013  
INVENTOR(S)       : Cazzanti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 148 days.

Signed and Sealed this

Eighth Day of September, 2015

Michelle K. Lee
*Director of the United States Patent and Trademark Office*